United States Patent
Chen et al.

(10) Patent No.: US 10,468,896 B2
(45) Date of Patent: Nov. 5, 2019

(54) INTELLIGENT SWITCH SYSTEM AND CONTROL METHOD

(71) Applicant: AMBIT MICROSYSTEMS (SHANGHAI) LTD., Shanghai (CN)

(72) Inventors: Sheng-Wen Chen, New Taipei (TW); Yu-Hu Yan, New Taipei (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 139 days.

(21) Appl. No.: 15/655,842

(22) Filed: Jul. 20, 2017

(65) Prior Publication Data
US 2018/0366966 A1 Dec. 20, 2018

(30) Foreign Application Priority Data
Jun. 14, 2017 (CN) .......................... 2017 1 0445385

(51) Int. Cl.
*H02J 7/00* (2006.01)

(52) U.S. Cl.
CPC ............. *H02J 7/0052* (2013.01); *H02J 7/00* (2013.01); *H02J 2007/0059* (2013.01); *H02J 2007/0062* (2013.01); *H02J 2007/0096* (2013.01)

(58) Field of Classification Search
CPC ............. H02J 7/0052; H02J 2007/0059; H02J 2007/0096; H02J 2007/0062; H02J 7/00; H02J 7/0065
See application file for complete search history.

(56) References Cited

U.S. PATENT DOCUMENTS

| | | | |
|---|---|---|---|
| 6,329,796 B1 * | 12/2001 | Popescu | H02J 1/10 320/134 |
| 6,879,134 B2 * | 4/2005 | Stanesti | H02J 7/0018 320/135 |
| 7,049,756 B2 * | 5/2006 | Aiba | B41J 2/0452 315/172 |
| 7,256,568 B2 * | 8/2007 | Lam | H02M 1/10 323/222 |
| 7,425,815 B2 * | 9/2008 | Wong | H02J 7/041 320/114 |

(Continued)

FOREIGN PATENT DOCUMENTS

| CN | 101944074 A | 1/2011 |
|---|---|---|
| CN | 103208831 A | 7/2013 |

(Continued)

*Primary Examiner* — Helen Rossoshek
(74) *Attorney, Agent, or Firm* — ScienBiziP, P.C.

(57) ABSTRACT

A charging path switching circuit includes a first port, a second port, a path switch unit, and a conversion unit. The first port is connected to an external electronic device to obtain a first electrical signal. The second port is connected to an external power source to obtain a second electrical signal. The conversion unit is connected the path switch unit and converts the first electrical signal or the second electrical signal to a predetermined voltage. The path switch unit is connected to the first port and the second port. The path switch unit selects to connect to the first port or the second port, to obtain the first electrical signal or the second electrical signal according to the connection of the first and the second port. The path switch unit preferentially selects to obtain the second electrical signal from the second port.

7 Claims, 3 Drawing Sheets

(56) References Cited

U.S. PATENT DOCUMENTS

| | | | | |
|---|---|---|---|---|
| 7,733,060 B2* | 6/2010 | Kojima | ............... | H02J 7/0011 |
| | | | | 320/125 |
| 7,791,313 B2* | 9/2010 | Stanesti | ............ | H02J 7/0057 |
| | | | | 320/116 |
| 9,859,737 B2* | 1/2018 | Chen | ................. | B65D 19/385 |
| 2004/0145348 A1* | 7/2004 | Bucur | ............... | H02J 7/0018 |
| | | | | 320/128 |
| 2004/0155627 A1* | 8/2004 | Stanesti | ............ | H02J 7/0018 |
| | | | | 320/127 |
| 2005/0168194 A1* | 8/2005 | Stanesti | ............ | H02J 7/0057 |
| | | | | 320/134 |
| 2007/0241732 A1* | 10/2007 | Luo | ................... | H02J 7/0055 |
| | | | | 323/281 |
| 2012/0098337 A1* | 4/2012 | Sasaki | ................. | H02J 1/12 |
| | | | | 307/23 |
| 2012/0305654 A1* | 12/2012 | Wang | ............. | G06K 19/0707 |
| | | | | 235/492 |
| 2015/0134980 A1* | 5/2015 | Chen | ................. | G06F 1/3206 |
| | | | | 713/300 |
| 2018/0083459 A1* | 3/2018 | Huang | ............. | H02J 7/0008 |

FOREIGN PATENT DOCUMENTS

| | | | |
|---|---|---|---|
| CN | 104321960 A | | 1/2015 |
| JP | 2013065932 A | | 4/2013 |
| JP | 2015211540 A | | 11/2015 |
| TW | 201214923 A | | 4/2012 |
| TW | 201330356 A | | 7/2013 |
| TW | 201633647 A | | 9/2016 |

* cited by examiner

INTELLIGENT SWITCH SYSTEM AND CONTROL METHOD

FIELD

The subject matter herein generally relates to switching systems and control, and particularly to an intelligent switch system with a sleep mode and a wake-up mode, and control method.

BACKGROUND

Most portable electronic devices generally just have one universal serial bus (USB) interface. The USB interface can achieve data transmission, OTG (On-The-Go) function, battery charging, and other functions. One USB interface can achieve multiple functions, but when the USB interface is used for transmitting data or implementing OTG function, the battery power of the electronic device cannot be charged or discharged from the USB interface.

BRIEF DESCRIPTION OF THE DRAWINGS

Implementations of the present technology will now be described, by way of example only, with reference to the attached figures.

DETAILED DESCRIPTION

Figure 1:
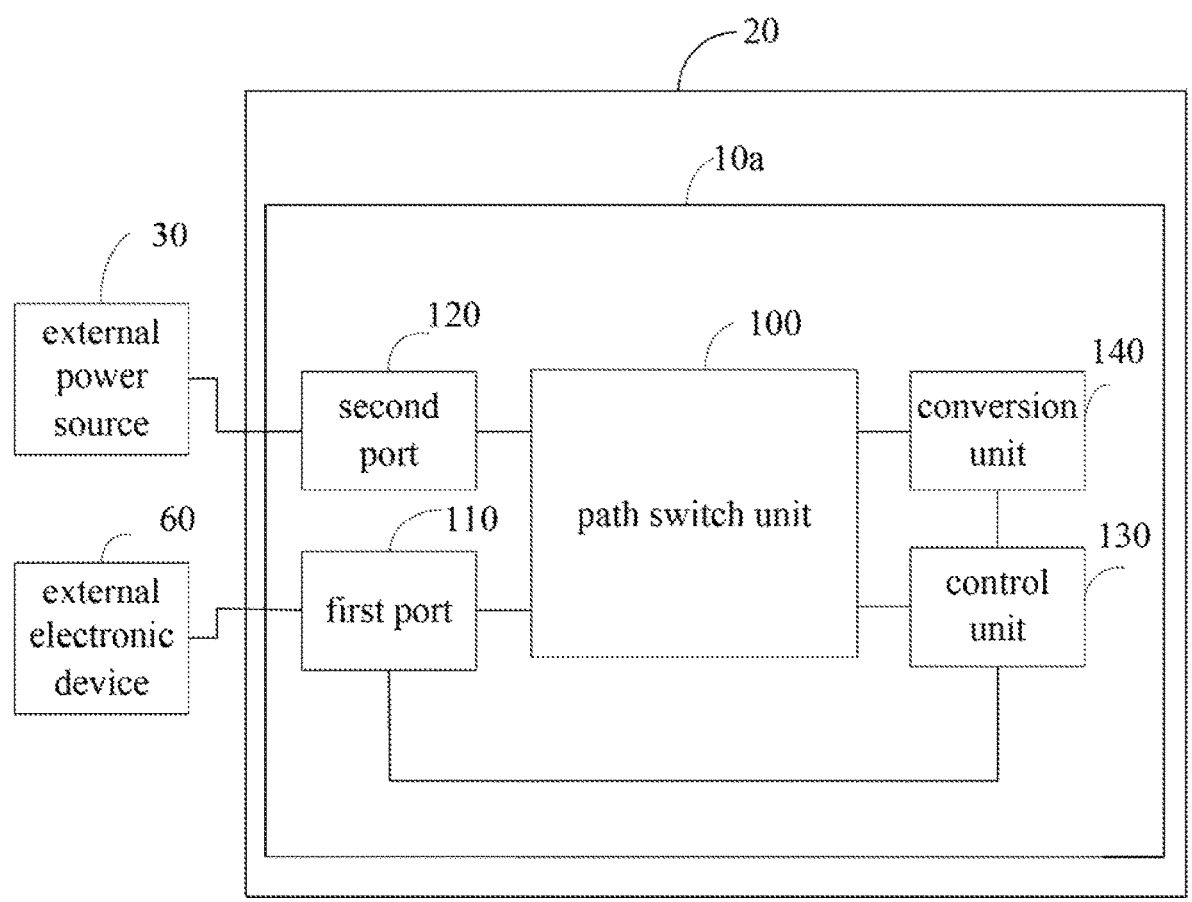
FIG. 1 is a schematic diagram of a first embodiment of a charging path switch circuit and an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The disclosure is described in relation to a charging path switch circuit and an electronic device which comprises the charging path switch circuit.

FIG. 1 illustrates a schematic diagram of a first embodiment of a charging path switch circuit and an electronic device. In at least one embodiment, the charging path switch unit 10a comprises a path switch unit 100, a first port 110, a second port 120, a control unit 130, and a conversion unit 140. The first port 110 is coupled to an external electronic device 60 to obtain a first electrical signal from the external electronic device 60. The second port 120 is coupled to an external power source 30 to obtain a second electrical signal. The path switch unit 100 is coupled to the first port 110 and the second port 120. The path switch unit 100 is coupled to the first port 110 or to the second port 120, to obtain the first electrical signal or the second electrical signal, according to the first port 110 connection and the second port 120 connection. In at least one embodiment, when the first port 110 is coupled to the external electronic device 60 and the second port 120 is coupled to the external power source 30, the path switch unit 100 preferentially selects the second electrical signal from the second port 120.

The conversion unit 140 is coupled to the path switch unit 100. The conversion unit 140 converts the first electrical signal from the first port 110 or the second electrical signal from the second port 120 to a predetermined voltage. The control unit 130 is coupled to the first port 110, the second port 120, the path switch unit 100, and the conversion unit 140. The control unit 130 outputs control signals to the path switch unit 100 according to the first port 110 connection and the second port 120 connection, in order to control the path switch unit 100 to select a coupling to the first port 110 or a coupling to the second port 120.

In at least one embodiment, when the first port 110 is uncoupled from the external electronic device 60 and the second port 120 is coupled to the external power source 30, the control unit outputs a first control signal to the path switch unit 100. The path switch unit 100 will select the second electrical signal from the external power source 30 by the second port 120. When the first port 110 is coupled to the external electronic device 60 and the second port 120 is uncoupled from the external power source 30, the control unit outputs the first control signal to the path switch unit 100. The path switch unit 100 will select the first electrical signal from the external electronic device 60 by the first port 110. When the first port 110 is coupled to the external electronic device 60 and the second port 120 is coupled to the external power source 30, the control unit 130 outputs the first control signal to the path switch unit 100, then the path switch unit 100 preferentially selects the second electrical signal from the external power source 30 by the second port 120.

In at least one embodiment, when the first port 110 is coupled to the external electronic device 60 and the second port 120 is coupled to the external power source 30, the control unit 130 outputs the second control signal to the path switch unit 100. The path switch unit 100 will then prefer the second electrical signal from the external power source 30 by the second port 120.

In at least one embodiment, the first control signal is a low logic level signal and the second control signal is a high logic level signal. The external electronic device 60 can be a telephone, a camera, or other electronic device.

Figure 2:
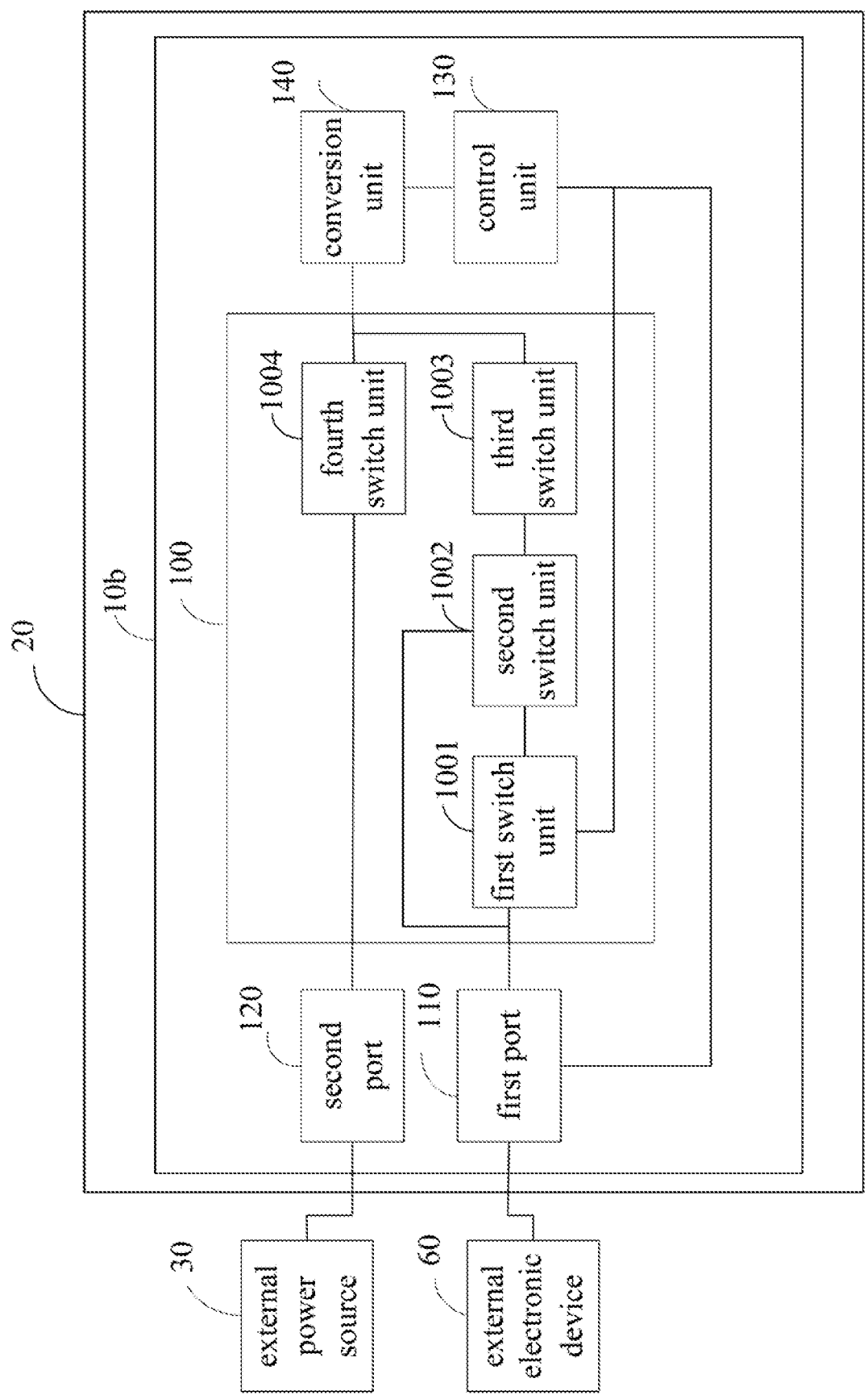
FIG. 2 is a schematic diagram of a second embodiment of the charging path switch circuit and the electronic device of FIG. 1.

FIG. 2 illustrates a block diagram of an embodiment of the charging path switch unit 10b. In at least one embodiment, the charging path switch unit 10b comprises a path switch unit 100, a first port 110, a second port 120, a control unit 130, and a conversion unit 140. The path switch unit 100, the first port 110, second port 120, the control unit 130, and the conversion unit 140 are similar to those in the embodiment described above.

In at least one embodiment, the path switch unit 100 comprises a first switch unit 1001, a second switch unit 1002, a third switch unit 1003, and a fourth switch unit 1004. The first switch unit 1001 is coupled to the first port 110 and the control unit 130. When the first switch unit 1001 receives the first control signal from the control unit 130, the first switch unit 1001 is turned off. When the first switch unit 1001 receives the second control signal from the control unit 130, the first switch unit 1001 is turned on. The second switch unit 1002 is coupled to the first switch unit 1001 and the first port 110. The third switch unit 1003 is coupled between the second switch unit 1002 and the fourth switch unit 1004 and the conversion unit 140 connection point. The fourth switch unit 1004 is coupled between the second port 120 and the conversion unit 140. The fourth switch unit 1004 is turned on when the second port 120 is coupled to the external power source 30.

In at least one embodiment, when the first port 110 is uncoupled from the external electronic device 60 and the second port 120 is coupled to the external power source 30, the fourth switch unit 1004 is turned on. The control unit 130 will output a first control signal to control the first switch unit 1001, the second switch unit 1002, and the third switch unit 1003 to turn off. The second port 120 thus obtains the second electrical signal from the external power source 30. When the first port 110 is coupled to the external electronic device 60 and the second port 120 is uncoupled from the external power source 30, the fourth switch unit 1004 is turned off. The control unit 130 outputs the first control signal to control the first switch unit 1001 to turn off, and the second switch unit 1002 and the third switch unit 1003 to turn on, then the first port 110 obtains the first electrical signal from the external electronic device 60. When the first port 110 is coupled to the external electronic device 60 and the second port 120 is coupled to the external power source 30, the fourth switch unit 1004 is turned on. The control unit 130 outputs the first control signal to control the second switch unit 1002 to turn on, and the first switch unit 1001 and the third switch unit 1003 turn off, then the second port 120 preferentially obtains the second electrical signal from the external power source 30.

In at least one embodiment, when the first port 110 is coupled to the external electronic device 60 and the second port 120 is coupled to the external power source 30, the fourth switch unit 1004 is turned on and the control unit 130 outputs a second control signal to control the second switch unit 1002, the first switch unit 1001, and the third switch unit 1003 to turn off. The second port 120 preferentially obtains the second electrical signal from the external power source 30.

In at least one embodiment, the first control signal is a low logic level signal and the second control signal is a high logic level signal. The external electronic device 60 can be a telephone, a camera, or other electronic device.

Figure 3:
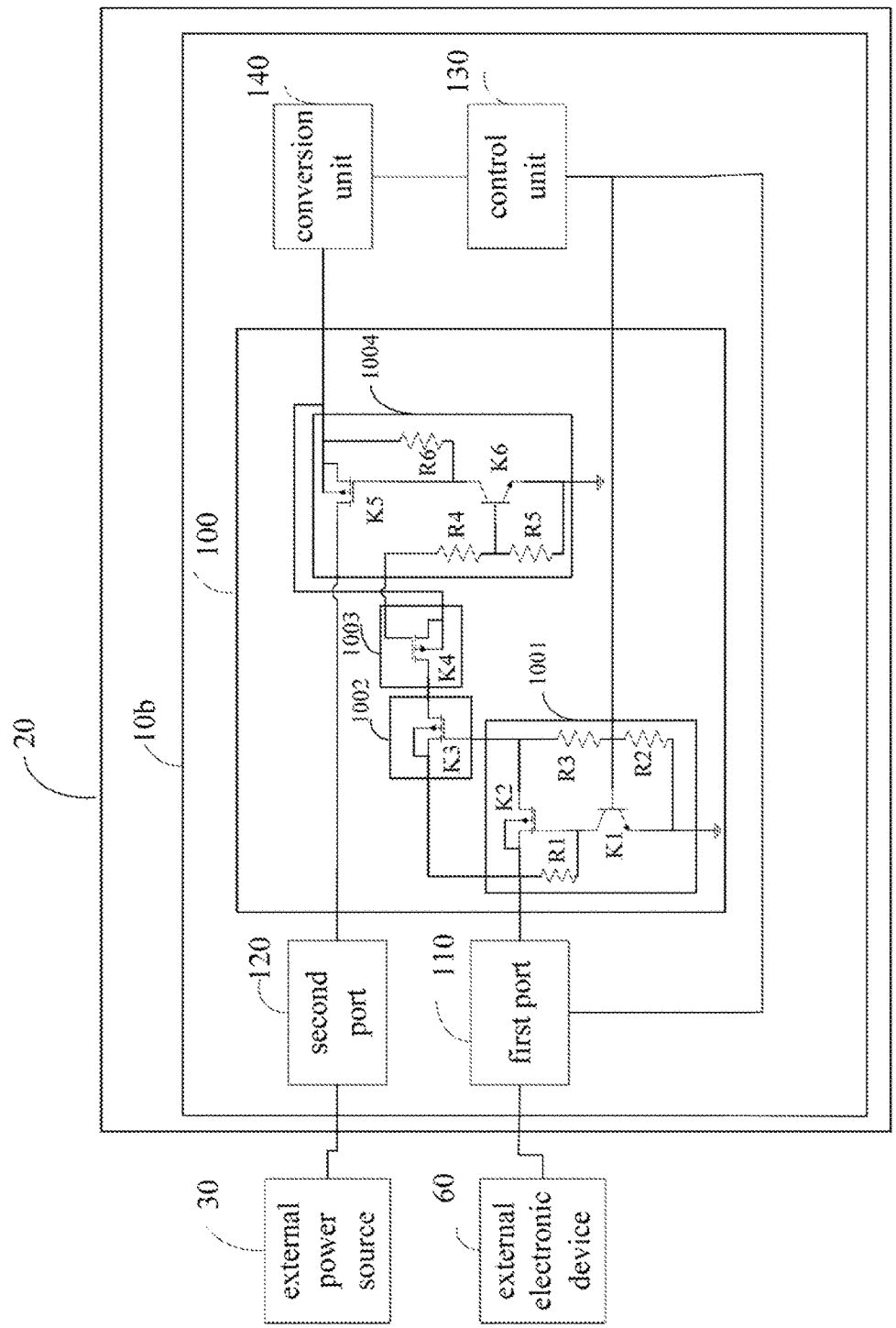
FIG. 3 is a circuit diagram of an embodiment of a charging path switch circuit and electronic device.

FIG. 3 illustrates a circuit diagram of an embodiment of the charging path switch unit 10b. In at least one embodiment, the charging path switch unit 10b comprises a path switch unit 100, a first port 110, a second port 120, a control unit 130, and a conversion unit 140. The path switch unit 100, the first port 110, second port 120, the control unit 130, and the conversion unit 140 are similar to those in the embodiment described above. The path switch unit 100 comprises a first switch unit 1001, a second switch unit 1002, a third switch unit 1003, and a fourth switch unit 1004.

The first switch unit 1001 comprises a first switch K1 with a first switch first end, a first switch second end, and a first switch control end; a second switch K2 with a second switch first end, a second switch second end, and a second switch control end is also comprised. Also comprised are a first resistor R1 with a first resistor first end and a first resistor second end, a second resistor R2 with a second resistor first end and a second resistor second end, and a third resistor R3 with a third resistor first end and a third resistor second end. The first switch first end is coupled to ground, the first switch second end is coupled to the first resistor first end, and the first switch control end is coupled to the second resistor first end and the control unit 130. The first resistor second end is coupled to the first port 110 and the second resistor second end is coupled to ground. The second switch first end is coupled to the first port and the first resistor second end, the second switch second end is coupled to the third resistor second end, and the second switch control end is coupled to the first switch and the first resistor connection point. The third resistor first end is coupled to the first switch control end, and the third resistor second end is coupled to the control unit 130 and the second resistor first end.

When the first switch unit 1001 receives the first control signal from the control unit 130, the first switch K1 and the second switch K2 are turned off. When the first switch unit 1001 receives the second control signal from the control unit 130, the first switch K1 and the second switch K2 are turned on. When the first switch K1 and the second switch K2 are both turned on, the first switch unit 1001 is turned on, and when the first switch K1 and the second switch K2 are both turned off, the first switch unit 1001 is turned off.

In at least one embodiment, the second switch unit 1002 comprises a third switch K3 with a third switch first end, a third switch second end, and a third switch control end. The third switch first end is coupled to the second switch K2 and the first resistor R1 connection point, and the third switch control end is coupled to a connection point of the second switch unit K2 and the third resistor R3. When the third switch K3 is turned on, the second switch unit 1002 is turned on, and when the third switch K3 is turned off, the second switch unit 1002 is turned off.

In at least one embodiment, the third switch unit 1003 comprises a fourth switch K4 with a fourth switch first end, a fourth switch second end, and a fourth switch control end. The fourth switch first end is coupled to the conversion unit 140, and the fourth switch second end is coupled to the third switch second end. When the fourth switch K4 is turned on, the third switch unit 1003 is turned on, and when the fourth switch unit 1004 is turned off, the third switch unit 1003 is turned off.

In at least one embodiment, the fourth switch unit 1004 comprises a fourth resistor R4 with a fourth resistor first end, and a fourth resistor second end, a fifth resistor R5 with a fifth resistor first end and a fifth resistor second end, a sixth resistor R6 with a sixth resistor first end, and a sixth resistor second end, a fifth switch K5 with a fifth switch first end, a fifth switch second end and a fifth switch control end, and a sixth switch K6 with a sixth switch first end, a sixth switch second end, and a sixth switch control end. The fourth resistor first end is coupled to the fourth switch control end, and the fourth resistor second end is coupled to the fifth resistor first end. The fifth resistor second end is coupled to ground. The fifth switch first end is coupled to the conversion unit 140, the fifth switch second end is coupled to the second port 120, and the fifth switch control end is coupled to the sixth resistor first end and the sixth switch second end. The sixth resistor second end is coupled to the fifth switch first end and the conversion unit 140. When the fifth switch K5 and the sixth switch K6 are both turned on, the fourth switch unit 1004 is turned on, and when the fifth switch K5 and the sixth switch K6 are both turned off, the fourth switch unit 1004 is turned off.

In at least one embodiment, the electronic device 20 comprises a charging path switch circuit 10b. The electronic device 20 can be coupled to an external electronic device 60 to obtain a first electrical signal from the external electronic device 60 or to exchange data with the external electronic device or implement OTG (on the go) function. The electronic device 20 can also be coupled to an external power source 30 to obtain a second electrical signal from the external power source 30. The external electronic device 60 can be a telephone, a camera, or other electronic device. In the embodiment, the first port 110 is a USB (Universal Serial Bus) interface.

OTG technology allows a device with an USB interface to communicate directly without computer control, to make the device work as a master device exchanging data directly with an external device. The limitation of data transmission only being between the device and the computer is removed. Device with the OTG function complies with the host negotiation protocol. The USB interface is in the device with an ID pin. When the ID pin is connected to ground (level is low), the device works as the master device, and the external device coupled to the USB interface works as a slave device. When the ID pin is floating, the device works as the slave device, and the external device works as the master device.

In at least one embodiment, the charging path switch unit 10b comprises a path switch unit 100, a first port 110, a second port 120, a control unit 130, and a conversion unit 140. The first port 110 can be coupled to the external electronic device 60 to obtain the first electrical signal from the external electronic device 60 or exchange data or implement OTG function with the external electronic device 60. In the embodiment, the first port 110 is a USB interface complying with the host negotiation protocol. The first port 110 comprises a first port ID pin. When the first port ID pin is connected to ground, the electronic device 20 works as the master device and the external electronic device 60 coupled to the first port 110 works as a slave device. When the first port ID pin is floating, the electronic device 20 works as the slave device and the external electronic device 60 works as the master device.

The second port 120 can be coupled to the external power source 30 to obtain the second electrical signal. The path switch unit 100 is coupled to the first port 110 and the second port 120. The path switch unit 100 is selectively coupled to the first port 110 to obtain the first electrical signal or transmit data or implement OTG function, or selectively coupled to the second port 120 to obtain the second electrical signal, depending on the first port 110 connection and the second port 120 connection.

In at least one embodiment, when the first port 110 is coupled to the external electronic device 60 and the second port 120 is coupled to the external power source 30, the path switch unit 100 preferentially selects to obtain the second electrical signal from the second port 120.

The conversion unit 140 is coupled to the path switch unit 100. The conversion unit 140 converts the first electrical signal from the first port 110 or the second electrical signal from the second port 120 to a predetermined voltage.

The control unit 130 is coupled to the first port 110, the second port 120, the path switch unit 100, and the conversion unit 140. The control unit 130 can be in a master mode and a slave mode. When the first port ID pin is coupled to the ground, the control unit 130 operates in the master mode. Thus the electronic device 20 works as a master device and the external electronic device 60 connected to the first port 110 works as the slave device. When the first port ID pin is floating, the control unit 130 operates in the slave mode, thus the electronic <electronic or electric?> device 20 works as the slave mode and the external electronic device 60 coupled to the first port 110 works as the master device. The control unit 130 outputs control signals to the path switch unit 100 according to the first port 110 connection and the second port 120 connection, and the type of the external electronic device 60 and the electronic device 20, in order to control the path switch unit 100 to select a coupling to the first port 110 or a coupling to the second port 120.

In at least one embodiment, when the first port 110 is uncoupled from the external electronic device 60 and the second port 120 is coupled to the external power source 30, the control unit outputs a first control signal to the path switch unit 100, then the path switch unit 100 selects the second electrical signal from the external power source 30 by the second port 120.

When the first port 110 is coupled to the external electronic device 60 and the second port 120 is uncoupled from the external power source 30, the control unit outputs a first control signal to the path switch unit 100, then the path switch unit 100 selects the first electrical signal from the external power source 30 by the first port 110.

When the first port 110 is coupled to the external electronic device 60 and the second port 120 is coupled to the external power source 30, the electronic device 20 works as the master device and the external electronic device 60 works as the slave device; the control unit 130 outputs the second control signal to the path switch unit 100, then the path switch unit 100 preferentially selects the second electrical signal from the external power source 30 by the second port 120, and the electronic device 20 implements OTG function with the external electronic device 60.

When the first port 110 is coupled to the external electronic device 60 and the second port 120 is coupled to the external power source 30, the electronic device 20 works as the slave device and the external electronic device 60 works as the master device; the control unit 130 outputs the first control signal to the path switch unit 100, then the path switch unit 100 preferentially selects the second electrical signal from the external power source 30 by the second port 120, and the electronic device 20 can exchange date with the external electronic device 60.

In at least one embodiment, the first control signal is a low logic level signal and the second control signal is a high logic level signal. The external electronic device 60 can be a telephone, a camera, or other electronic device.

In at least one embodiment, the path switch unit 100 comprises a first switch unit 1001, a second switch unit 1002, a third switch unit 1003, and a fourth switch unit 1004. The first switch unit 1001 is coupled to the first port 110 and the control unit 130. When the first switch unit 1001 receives the first control signal from the control unit 130, the first switch unit 1001 is turned off. When the first switch unit 1001 receives the second control signal from the control unit 130, the first switch is turned on. The second switch unit 1002 is coupled to the first switch unit 1001 and the first port 110. The third switch unit 1003 is coupled between the second switch unit 1002 and also coupled to the fourth switch unit 1004 and the conversion unit 140 connection point. The fourth switch unit 1004 is coupled between the second port 120 and the conversion unit 140. The fourth switch unit 1004 is turned on when the second port 120 is coupled to the external power source 30.

In at least one embodiment, when the first port 110 is uncoupled from the external electronic device 60 and the second port 120 is coupled to the external power source 30, the fourth switch unit 1004 is turned on and the control unit 130 outputs a first control signal to control the first switch unit 1001. The second switch unit 1002 and the third switch unit 1003 turn off; then the second port 120 obtains the second electrical signal from the external power source 30.

When the first port 110 is coupled to the external electronic device 60 and the second port 120 is uncoupled from the external power source 30, the fourth switch unit 1004 is turned off and the control unit 130 outputs the first control signal to control the first switch unit 1001 to turn off. The second switch unit 1002 and the third switch unit 1003 turn on, then the first port 110 obtains the first electrical signal from the external electronic device 60.

When the first port 110 is coupled to the external electronic device 60 and the second port 120 is coupled to the external power source 30, the electronic device 20 works as the master device and the external electronic device 60 works as the slave device; the fourth switch unit 1004 is turned on, and the control unit 130 outputs the first control signal to control the second switch unit 1002 to turn on. The first switch unit 1001 and the third switch unit 1003 turn off, then the second port 120 obtains the second electrical signal from the external power source 30, and the electronic device 20 can implement OTG function with the external electronic device 60.

When the first port 110 is coupled to the external electronic device 60 and the second port 120 is coupled to the external power source 30, the electronic device 20 works as the slave device and the external electronic device 60 works as the master device. The fourth switch unit 1004 is turned on and the control unit 130 outputs the first control signal to control the second switch unit 1002; the first switch unit 1001 and the third switch unit 1003 turn off, then the second port 120 obtains the second electrical signal from the external power source 30, and the electronic device 20 can exchange data with the external electronic device 60.

In the embodiment, the first control signal is a low logic level signal and the second control signal is a high logic level signal. The external electronic device 60 can be a telephone, a camera, or other electronic device. In the embodiment, the first switch unit 1001, the second switch unit 1002, the third switch unit 1003, and the fourth switch unit 1004 are similar to those in FIG. 3 as described above.

The charge switching circuits 10a and the 10b can select a charging path automatically to obtain the first electrical signal or the second electrical signal according to the first port 110 connection and the second port 120 connection. The electronic device 20 comprises the charge switching circuit 10b. The electronic device 20 further can obtain the electrical signal, and simultaneously implement the OTG function with the external electronic device 60. The electronic device 20 further can obtain the electrical signal, and simultaneously exchange data with the external electronic device 60.

Many details are often found in the art such as the other features of an intelligent switch system and control method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A charging path switching circuit comprising:
   a first port selectively coupled to an external electronic device and configured to obtain a first electrical signal from the external electronic device;
   a second port selectively coupled to an external power source and configured to obtain a second electrical signal from the external power source;
   a path switch unit coupled to the first port and the second port, and configured to select to couple to the first port or couple to the second port, to obtain the first electrical signal or the second electrical signal according to the first port connection and the second port connection, wherein the path switch unit preferentially selects to obtain the second electrical signal from the second port when the first port is coupled to the external electronic device and the second port is coupled to the external power source;
   a conversion unit coupled to the path switch unit, and configured to convert the first electrical signal from the first port or the second electrical signal from the second port to a predetermined voltage;
   a control unit coupled to the first port, the second port, the path switch unit and the conversion unit, wherein the control unit outputs control signals to the path switch unit according to the first port connection and the second port connection, in order to control the path switch unit to select to couple to the first port or couple to the second port, to obtain the first electrical signal or the second electrical signal,
   wherein the path switch unit comprises:
      a first switch unit coupled to the first port and the control unit;
      a second switch unit coupled to the first switch unit and the first port;
      a third switch unit coupled to the second switch unit; and
      a fourth switch unit coupled between the second port and the conversion unit, wherein the fourth switch unit is further coupled to the conversion unit and the third switch unit;
   wherein the first switch unit comprises:
      a first resistor with a first resistor first end and a first resistor second end coupled to the first port;
      a second resistor with a second resistor first end and a second resistor second end coupled to ground;
      a first switch with a first switch first end coupled to ground, a first switch second end coupled to the first resistor first end and a first switch control end coupled to the second resistor first end and the control unit;
      a third resistor with a third resistor first end coupled to the first switch control end and a third resistor second end coupled to the control unit and the second resistor first end;
      a second switch with a second switch first end coupled to the first port and the first resistor second end, a second switch second end coupled to the third resistor second end and a second switch control end coupled to the first switch second end; and when the first switch and the second switch are turned on synchronously, the first switch is turned on, and when the first switch and the second switch are turned off, the first switch unit is turned off.

2. The charging path switching circuit of claim 1, wherein when the first port is uncoupled to the external electronic device and the second port is coupled to the external power source, the fourth switch unit is turned on and the control unit outputs a first control signal to control the first switch unit, the second switch unit and the third switch unit turn off, then the second port obtains the second electrical signal from the external power source;

when the first port is coupled to the external electronic device and the second port is uncoupled to the external power source, the fourth switch unit is turned off and the control unit outputs the first control signal to control the first switch unit turns off, the second switch unit and the third switch unit turn on, then the first port obtains the first electrical signal from the external electronic device; and when the first port is coupled to the external electronic device and the second port is coupled to the external power source, the fourth switch unit is turned on and the control unit outputs the first control signal to control the second switch unit turns on, the first switch unit and the third switch unit turn off, then the second port preferentially obtains the second electrical signal from the external power source.

3. The charging path switching circuit of claim 1, wherein when the first port is coupled to the external electronic device and the second port is coupled to the external power source, the fourth switch unit is turned on and the control unit outputs a second control signal to control the second switch unit, the first switch unit and the third switch unit turn off, then the second port preferentially obtains the second electrical signal from the external power source.

4. The charging path switching circuit of claim 1, wherein the second switch unit comprises a third switch with a third switch first end coupled to the first switch unit, a third switch second end and a third switch control end coupled to the first switch unit; and when the third switch is turned on, the second switch unit is turned on, and when the third switch is turned off, the second switch unit is turned off.

5. The charging path switching circuit of claim 1, wherein the third switch unit comprises a fourth switch with a fourth switch first end coupled to the conversion unit, a fourth switch second end coupled to the second switch unit and a fourth switch control end; and when the fourth switch is turned on, the third switch unit is turned on, and when the fourth switch is turned off, the third switch unit is turned off.

6. A charging path switching circuit comprising:

a first port selectively coupled to an external electronic device and configured to obtain a first electrical signal from the external electronic device;

a second port selectively coupled to an external power source and configured to obtain a second electrical signal from the external power source;

a path switch unit coupled to the first port and the second port, and configured to select to couple to the first port or couple to the second port, to obtain the first electrical signal or the second electrical signal according to the first port connection and the second port connection, wherein the path switch unit preferentially selects to obtain the second electrical signal from the second port when the first port is coupled to the external electronic device and the second port is coupled to the external power source;

a conversion unit coupled to the path switch unit, and configured to convert the first electrical signal from the first port or the second electrical signal from the second port to a predetermined voltage;

a control unit coupled to the first port, the second port, the path switch unit and the conversion unit, wherein the control unit outputs control signals to the path switch unit according to the first port connection and the second port connection, in order to control the path switch unit to select to couple to the first port or couple to the second port, to obtain the first electrical signal or the second electrical signal, wherein the path switch unit comprises:
a first switch unit coupled to the first port and the control unit;
a second switch unit coupled to the first switch unit and the first port;
a third switch unit coupled to the second switch unit; and
a fourth switch unit coupled between the second port and the conversion unit,
wherein the fourth switch unit is further coupled to the conversion unit and the third switch unit; and
wherein the fourth switch unit comprises:
a fourth resistor with a fourth resistor first end coupled to the third switch unit and a fourth resistor second end;
a fifth resistor with a fifth resistor first end coupled to the fourth resistor second end and a fifth resistor second end coupled to ground;
a fifth switch with a fifth switch first end coupled to the conversion unit, a fifth switch second end coupled to the fourth resistor first end, and a fifth switch control end;
a sixth switch with a sixth switch first end, a sixth switch second end coupled to the fifth switch control end, and a sixth switch control end coupled to the fourth resistor and the fifth resistor connection point;
a sixth resistor with a sixth resistor first end coupled to the fifth switch and the sixth switch connection point, and a sixth resistor second end coupled to the fifth switch first end and the conversion unit;
when the fifth switch and the sixth switch are turned on synchronously, the fourth switch unit is turned on, and when the fifth switch and the sixth switch are turned off, the fourth switch unit is turned off.

7. A charging path switching circuit comprising:

a first port selectively coupled to an external electronic device and configured to obtain a first electrical signal from the external electronic device;

a second port selectively coupled to an external power source and configured to obtain a second electrical signal from the external power source;

a path switch unit coupled to the first port and the second port, and configured to select to couple to the first port or couple to the second port, to obtain the first electrical signal or the second electrical signal according to the first port connection and the second port connection, wherein the path switch unit preferentially selects to obtain the second electrical signal from the second port when the first port is coupled to the external electronic device and the second port is coupled to the external power source; and a conversion unit coupled to the path switch unit, and configured to convert the first electrical signal from the first port or the second electrical signal from the second port to a predetermined voltage;

wherein the path switch unit comprises:
- a first switch unit coupled to the first port;
- a second switch unit coupled to the first switch unit and the first port;
- a third switch unit coupled to the second switch unit; and
- a fourth switch unit coupled between the second port and the conversion unit, wherein the fourth switch unit is further coupled to the conversion unit and the third switch unit; and wherein the first switch unit comprises;
- a first resistor with a first resistor first end and a first resistor second end coupled to the first port;
- a second resistor with a second resistor first end and a second resistor second end coupled to ground;
- a first switch with a first switch first end coupled to ground, a first switch second end coupled to the first resistor first end and a first switch control end coupled to the second resistor first end;
- a third resistor with a third resistor first end coupled to the first switch control end and a third resistor second end coupled to the second resistor first end;
- a second switch with a second switch first end coupled to the first port and the first resistor second end, a second switch second end coupled to the third resistor second end and a second switch control end coupled to the first switch second end; and
- when the first switch and the second switch are turned on synchronously, the first switch is turned on, and when the first switch and the second switch are turned off, the first switch unit is turned off.

* * * * *